United States Patent [19]

Griebeler

[11] Patent Number: 4,854,551

[45] Date of Patent: Aug. 8, 1989

[54] DEVICE FOR CONTROLLING OPERATING GAP OF CUTTING HEAD AND METHOD OF USING SAME

[75] Inventor: Elmer L. Griebeler, Streetsboro, Ohio

[73] Assignee: Cleveland Machine Controls, Inc., Cleveland, Ohio

[21] Appl. No.: 187,549

[22] Filed: Apr. 28, 1988

Related U.S. Application Data

[62] Division of Ser. No. 95,401, Sep. 10, 1987, Pat. No. 4,773,946.

[51] Int. Cl.⁴ ............................................. B23K 7/10
[52] U.S. Cl. ...................................................... 266/76
[58] Field of Search ............... 324/516, 517, 518, 558; 266/48, 76

[56] References Cited

U.S. PATENT DOCUMENTS

| | | | |
|---|---|---|---|
| 1,337,305 | 4/1920 | Bennett | 75/10.62 |
| 2,873,425 | 2/1959 | Huggins | 324/517 |
| 2,978,636 | 4/1961 | Fountain | 324/517 |
| 3,595,545 | 7/1971 | Sitnichenko et al. | 266/76 |
| 3,917,995 | 11/1975 | Clinton | 324/517 |
| 4,013,277 | 3/1977 | Schmitt | 266/76 |
| 4,241,304 | 12/1980 | Clinton | 324/516 |
| 4,328,049 | 5/1982 | Richardson | 148/9 |
| 4,363,468 | 12/1982 | Noe | 266/76 |
| 4,400,610 | 8/1983 | Murakami et al. | 219/124.02 |
| 4,520,307 | 5/1985 | Weiss et al. | 324/558 |

FOREIGN PATENT DOCUMENTS

| | | |
|---|---|---|
| 0199937 | 11/1986 | European Pat. Off. . |
| 1279814 | 8/1969 | Fed. Rep. of Germany . |
| 1948562 | 4/1971 | Fed. Rep. of Germany . |
| 2744362 | 4/1979 | Fed. Rep. of Germany . |
| 0149034 | 6/1981 | Fed. Rep. of Germany . |
| 1414437 | 11/1975 | United Kingdom . |

Primary Examiner—S. Kastler
Attorney, Agent, or Firm—Body, Vickers & Daniels

[57] ABSTRACT

There is provided a device for controlling the vertical operating gap between the lower end of a cutting head, such as a frame cutting torch, and a generally flat workpiece positioned below the cutting head as the head and workpiece are moved relative to each other for cutting the workpiece along a preselected cutting path wherein the device includes a plurality of elongated feelers dangling vertically downwardly from the cutting head toward the workpiece with each of the feelers having an upper end and a lower terminal end, means for supporting the feelers at the upper end at positions spaced angularly around the cutting head with the terminal, lower ends at the same vertical height with respect to the lower end of the cutting head, means for allowing free upward movement of the lower ends upon engagement of the lower ends with the workpiece, such as allowed by downwardly hanging chains or loosely held rigid rods, feedback means for driving the motor in a first direction moving the head upwardly from the workpiece and a second direction moving the head downwardly toward the workpiece to maintain the operating gap at a preselected value wherein the feedback means includes sensing means for maintaining all the downwardly dangling feelers spaced from the workpiece while the lower end of the feelers closest to the workpiece is maintained at a preselected distance from the workpiece. This one feeler changes from time-to-time as the sensing device carried by the cutting torch moves along the workpiece to sense impending changes in the height of the workpiece with respect to the present setting of the cutting torch or other cutting head.

7 Claims, 7 Drawing Sheets

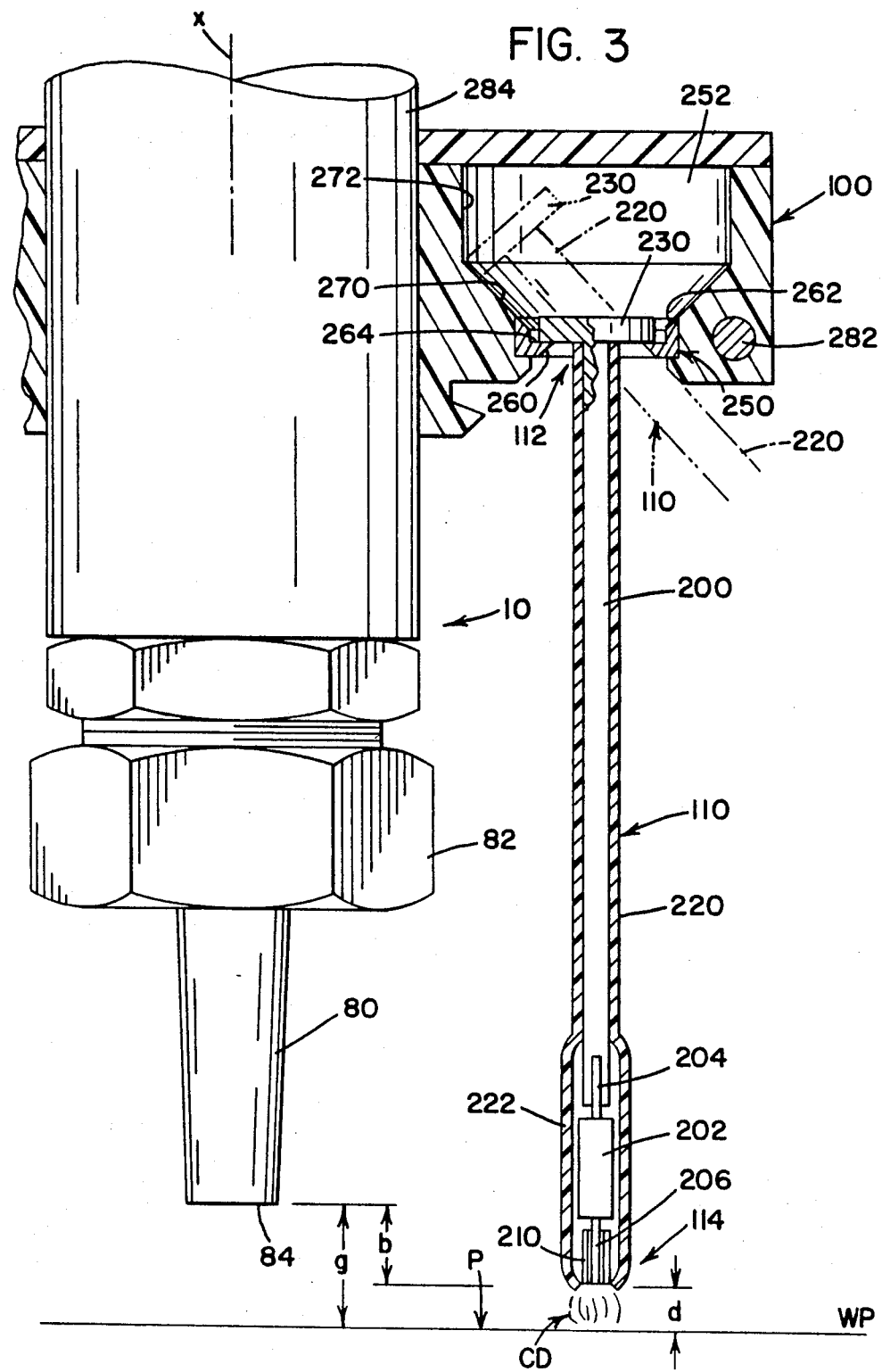

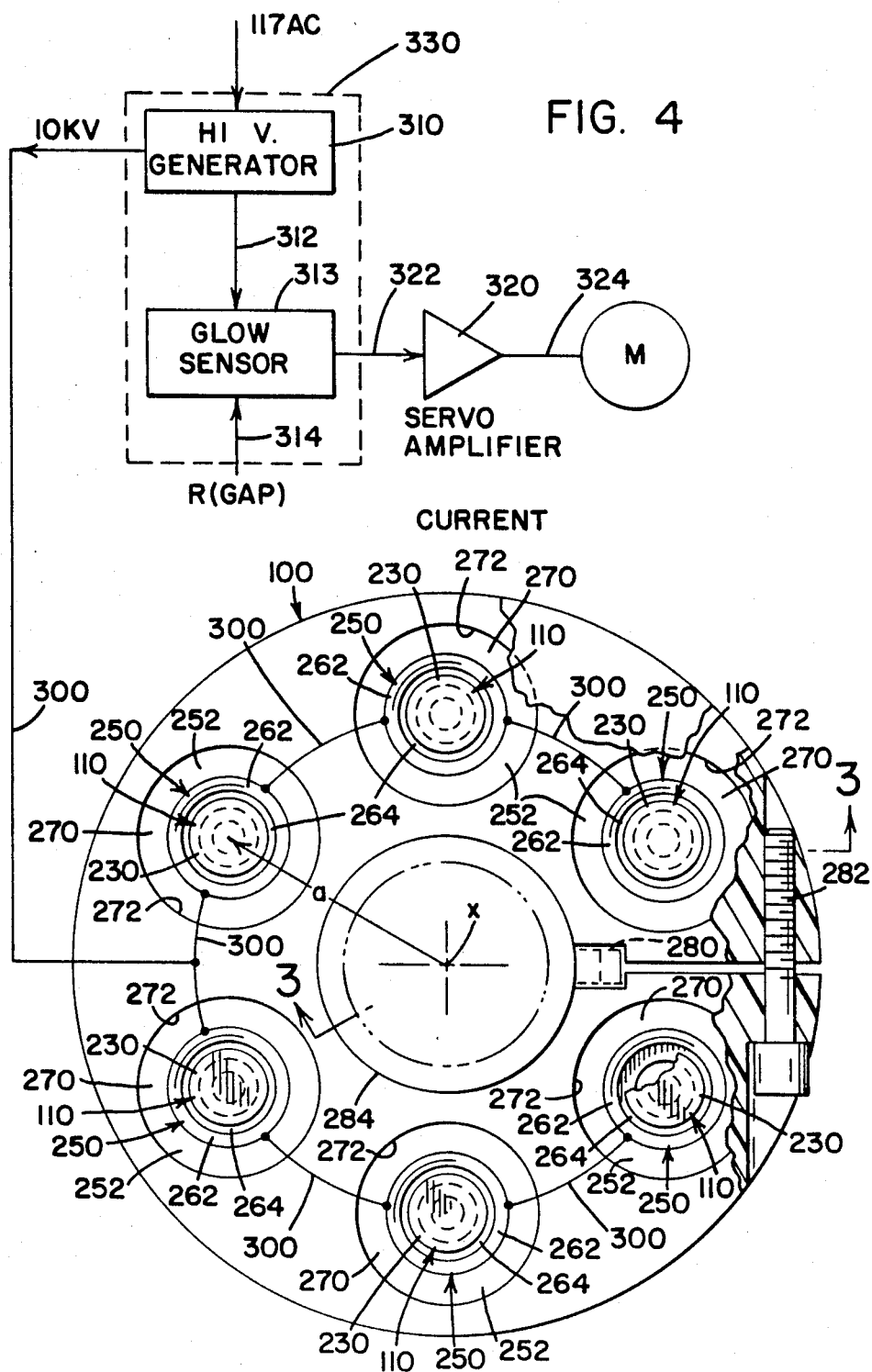

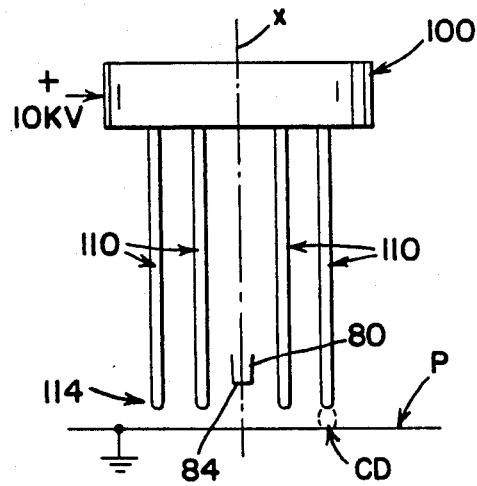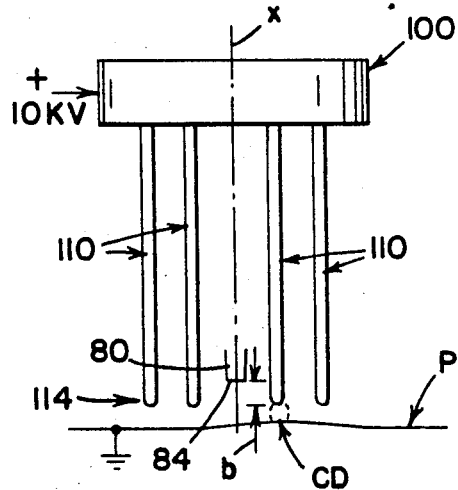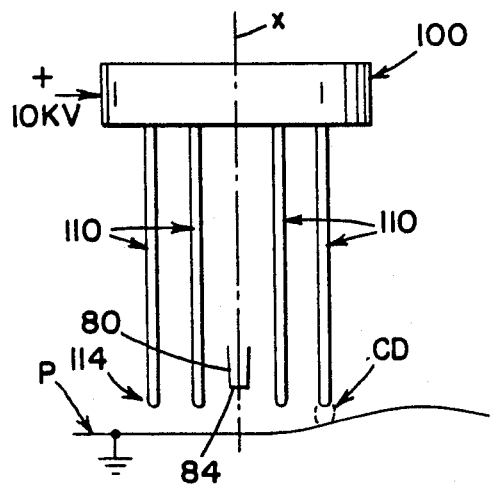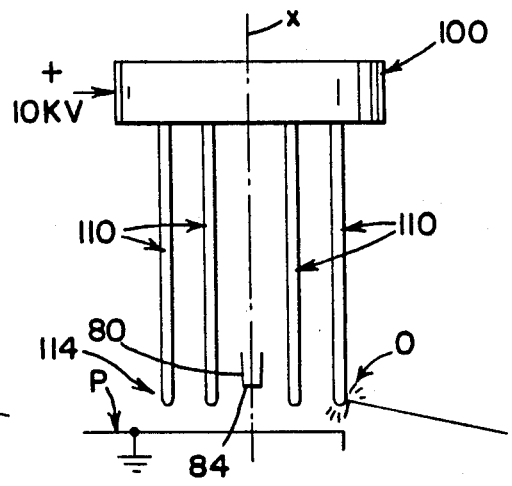

DEVICE FOR CONTROLLING OPERATING GAP OF CUTTING HEAD AND METHOD OF USING SAME

This is a division of application Ser. No. 095,401 filed Sept. 10, 1987, now U.S. Pat. No. 4,773,946.

The present invention relates to the art of control devices for cutting heads and more particularly to a device for automatically controlling the operating gap of a cutting head, such as a flame torch.

The invention is particularly applicable for controlling the operating gap, or flame length, of an acetylene gas cutting torch as it moves along a metal workpiece to cut the metal workpiece in a preselected path, and it will be described with particular reference thereto; however, the invention is much broader and may be used for automatically controlling the operating gap of various types of cutting heads, such as plasma cutting torches, laser cutting heads, and other cutting heads which have an optimum relatively small cutting gap or length which should be maintained for optimum cutting as the head moves along the workpiece in cut.

INCORPORATION BY REFERENCE

As background information, prior patent Wirth U.S. Pat. No. 3,746,326 is incorporated by reference herein as illustrating the art to which the present invention is particularly directed. It is not necessary to repeat the background information which is well known in the art and clearly set forth in this patent.

BACKGROUND OF THE INVENTION

When cutting flat metal plates with a flame cutting torch, or other cutting head, the head is moved along the upper surface of a plate and is maintained at a preselected distance from the plate to obtain optimum cutting parameters, such as fuel consumption, cutting speed and quality of the cut. Optimization of these parameters require that the end of the torch be maintained at a preselected gap or spacing from the top of the plate being cut; however, the plate is not uniform, the cutting is performed in a dirty atmosphere and surface impediments or obstacles may exist in the cutting path which could damage the torch if it is driven into the obstacle. In addition, under normal circumstances, several cutting heads are operated in unison from a single support beam above the workpiece. Each of the heads must be adjusted independently as different portions of the workpiece are being cut by the individual cutting heads or flame torches. Consequently, control of a group of cutting heads or flame torches cutting several identical cuts in a workpiece places tremendous burden upon the operator. The operator must anticipate the desired optimum spacing of each individual cutting head which may include six or more individual heads, and adjust each head separately in a vertical direction as the heads are moved along the workpiece. This presents a monumental control problem which defies manual manipulation skills even though each of the cutting heads have their own individual motors for adjusting the vertical height of the head with respect to the workpiece. Each of these motors is controlled by a separate unit which the operator must manipulate for the purposes of maintaining the optimum flame length or operating gap for the cutting heads as they progress along the upper surface of the plate being cut.

An optimum gap for a cutting torch is relatively close to the upper surface of the workpiece and is determined by the material of the plate, the equipment being employed, the fuel settings and the speed at which the cutting heads are manipulated along the upper surface being cut. Such an optimum small operating gap cannot be easily maintained. Often poor quality cuts are created. In many instances, the head is stubbed or spaced away from the workpiece sufficiently to lose the flame and, thus, interrupt the cut, with the obvious disadvantages of this eventuality, especially if several cuts are being made at the same time. Manual manipulation is complicated by the inability to observe the actual conditions being experienced by the individual cutting heads and to manipulate several heads at the same time. All of these disadvantages have resulted in a somewhat normal practice of setting the operating gap at a large distance, increasing the fuel consumption, slowing down the cutting rate, and hoping that no obstacles appear in the path of the moving torch. In this fashion, an inefficient cutting is accomplished with a large operating gap which has only the advantage of facilitating large variations in the plate surface without actual destruction of the torch, interrupting the cut, or extinguishing of the flame.

To overcome these disadvantages, for many years efforts have been made to sense the spacing between the plate and the head for the purpose of automatically controlling the operating gap by using the reversible motor through a feedback arrangement as opposed to manipulation of the vertical heights of the cutting heads by manual operation of the adjustment motors. One attempt involves an air back pressure arrangement as shown in Wirth U.S. Pat. No. 3,746,326. At best, this produced an adjustment having a tolerance of 0.25 inches, which is not generally close control of the operating gap. In addition, the heat, metal spatter, hot material, dust and bad environment seriously hindered the ability of the air sensor to provide accurate feedback control over the vertical height of the cutting torches. Another attempt involved the use of a capacitor ring surrounding the cutting torch and parallel to the workpiece. As the capacitance changed, a feedback signal was created that adjusted the height of the torch. However, this type of arrangement involved very small changes in the sensed capacitance. Such small changes were difficult to recognize and changed substantially due to the heat, dust and other capacitive affecting material between the sensing plate and the upper surface of the workpiece. These particular attempts to automatically control the operating gap or flame length of a cutting torch as it moved along a flat plate were not successful and were relatively expensive.

To produce a less expensive arrangement, it was suggested that limit switches could be employed between the cutting head, or torch, and the workpiece. One switch could determine the minimum height and another torch could determine the maximum height, or a single limit switch could be employed. These attempts were substantial disasters. Mechanical limit switches were quickly broken or destroyed by slag and other abutments on the plate being cut. Further, these limit switches, as the air back pressure arrangement, could anticipate changes in vertical height only in a single direction. Since the torch could move in several directions, limit switches were substantially ineffective even if they had been capable of withstanding the rigors of the adverse environment, which they were not.

In summary, attempts to automatically control the operating gap of the cutting torch to an optimum value by mechanical, pneumatic, and electrical feedback arrangements have been unsuccessful in that they are expensive, incapable of close control and subject to damage by the adverse environment. Consequently, manual operation is now quite prevalent even though several attempts have been made to automatically control the operating gap.

THE PRESENT INVENTION

The present invention overcomes the disadvantages of automatic controls previously employed to maintain the operating gap in a cutting head as it moves along a plate being cut and produces an automatic control for the cutting gap which is inexpensive, durable in use, and capable of controlling the cutting gap, flame length or other operating gap of a cutting head to a low tolerance, such as, without limitation, about 0.050 inches on either side of a preselected optimum value.

In accordance with the present invention, there is provided a device for automatically controlling the vertical operating gap between the lower end of a cutting head, such as a cutting torch, and a generally flat workpiece or plate below the cutting head as the head and workpiece are moved relative to each other with the head moving along the workpiece or metal plate in a given cutting path. In accordance with normal practice, this type of device includes a drive motor for reciprocating the head with respect to the workpiece or plate during the relative movement of the head along the cutting path. In accordance with the present invention, the device includes a plurality of elongated feelers dangling or hanging vertically downwardly from the head toward the workpiece. Each of these feelers has an upper end and lower terminal end. A support means or frame is fixed onto the cutting head for holding the feelers at the upper ends at positions spaced angularly around the head with the terminal ends of all feelers at the same vertical height with respect to the lower end of the cutting torch or head. These hanging feelers are constructed to allow free upward movement of the lower ends upon engagement of the lower ends with the workpiece. This is accomplished when using the preferred rigid elongated feelers by loosely holding the feelers in the support frame so that they may be moved upwardly or swung back and forth. As an alternative, the feelers are transversely flexible, such as downwardly hanging chains. Irrespective of the type of feeler used, the lower ends are the same height with respect to the cutting torch to control the ultimate position of the cutting torch with respect to the plate being cut. In accordance with the invention, there is provided a feedback means for driving the motor in a first direction moving the cutting head upwardly away from the workpiece and a second direction moving the cutting head downwardly toward the workpiece in a manner to maintain an operating gap at a preselected value. The term "preselected value" means a value which is controlled to give a preselected gap with a maximum and minimum tolerance in accordance with standard practice. The feedback means in accordance with the present invention includes a sensing arrangement or means for maintaining all the feelers spaced from the workpiece while the lower end of the feeler closest to the plate is maintained at a preselected distance from the workpiece. The distance of the closest feeler from the plate is controlled to control the operating gap. During operation, the feeler being controlled changes to be the particular feeler closest to the plate at any given time. In this fashion, the dangling feelers move along the plate as the cutting head cuts along the plate. The drive motors, by the feedback arrangement, attempt to move all the feelers downwardly into engagement with the workpiece; however, the feeler encountering the highest obstacle or surface of the plate becomes a control member. That feeler is controlled to maintain a preselected distance from the plate. As the feelers move with the cutting torch, different feelers become the control feeler having the "preselected distance" from the workpiece automatically maintained. All of the feelers are, thus, held at a lowermost position with respect to the plate being cut with an undetermined one of the feelers which encounters the highest surface condition having a preselected controlled spacing.

To accomplish the objective set forth above, an ultra-high voltage is applied in parallel through the individual feelers so that the closest feeler creates a sustained ionized discharge, or Corona discharge, between the plate or workpiece and the terminal end of the feeler. To maintain a Corona discharge at the ultra-high voltage which, in practice, exceeds about 2 to 5 K volts and is preferably about 10 K volts, a resistor is incorporated in the feeler near the terminal or lower end to create a sustained discharge instead of an abrupt spark discharge as a tip or end of one of the feelers engages the workpiece. Without this resistor, the feeler arrangement still operates; however, as the feelers are moved downwardly one engages the highest point on the flat plate to create a spark. The spark is detected so that the feelers are moved upwardly by raising the common support frame with the control motor. As soon as the upper movement extinguishes the arc, a downward movement is begun until the next arc is created by a feeler encountering the next highest area of the plate. By employing ultra-high voltage, atmosphere has a negligible effect on the operating characteristics of the feelers. Such high voltage operates accurately through dust, heat, spatter and other contaminants associated with the cutting of metal plate.

In accordance with another aspect of the present invention, an electrical characteristic of the feelers which measure the Corona or discharge effect, or a spark discharge, is measured and compared with a reference amount so that the drive motor is moved upwardly or downwardly to maintain the feelers in a position generally skimming across the upper surface of the plate being cut. In the case of a Corona or discharge operation, as explained above, which is preferred, the high voltage generator can be monitored to determine power, voltage or current which electrical characteristic is compared to a reference value to drive the head vertically to maintain a preselected Corona or discharge between one of the feelers and the workpiece. The power capability of the high voltage generator is sufficient to sustain only a single Corona or discharge. Consequently, only a single feeler is operative to provide the control feature at any given time.

When the spark concept is employed, which is an alternative, a spark is detected. This detection then causes a back-off of the motor until the spark is extinguished. This starts again a downward motion until the next spark is created between the feeler and the workpiece causing an upward movement. This action maintains the head at a lowermost, optimum spacing from the plate being cut. This alternate spark arrangement is considered to employ a step of comparing a value indicative of the spark condition with the detected condition at the ends of the feelers.

In accordance with the present invention, the lowermost feeler is maintained with the Corona or discharge having an adjustable preselected spacing in the range of 0.05–0.30 inches. In accordance with the invention, it is possible to maintain a tolerance of the spacing of the control feeler from the plate in the range of about 0.05 inches in either direction from the preselected set spacing; consequently, the operating flame length or operating gap of the cutting device is maintained within this relatively small tolerance. In the prior art, automatic control devices generally were operated only in the range of about 0.250 inches on either side of the automatic control point or set point spacing. For that reason, prior art devices had to be automatically set at a relatively high gap even though that high gap was not optimum for economic and efficient cutting.

In accordance with another aspect of the present invention, at least three feelers are spaced around the cutting head to sense upwardly protruding obstacles or rises in the plate surface at various locations as the cutting head moves in different directions with respect to the plate. These feelers are carried by a support frame which locates the feelers at the same radial distance from the cutting head so that the same sensitivity exists as the cutting head moves in different directions. In practice, as many as six feelers are employed and they are equally spaced, circumferentially around the cutting head to produce control operable in all directions. As mentioned above, a Corona is established only with respect to the feeler encountering the uppermost surface protrusion from the plate being cut. As the feelers move along the plate, the Corona discharge changes from feeler to feeler as different feelers encounter different surface variations. Only one Corona is established at any given time. If a feeler should engage the workpiece, they are mounted or constructed that such engagement does not harm the feelers or the cutting torch. Engagement of the plate by a feeler causes a movement of the head away from the plate until the Corona is again established.

In accordance with another aspect of the present invention, there is provided a method of operating the device mentioned above for automatically controlling the vertical operating gap between the lower end of the cutting head and the generally flat plate being cut. In accordance with still a further aspect of the present invention, the feeler assembly with the support frame is a separate sensing unit for use in controlling the vertical gap between the lower end of the cutting head and the workpiece being cut.

Even though the invention is specifically adapted for controlling the operating gap of a cutting head, the feeler arrangement can be employed for maintaining the vertical spacing of any device above a flat electrically conductive metal surface as the device moves along the flat surface.

The primary object of the present invention is the provision of a device for automatically controlling the operating gap of a cutting head, which device can maintain an optimum gap for economical and quality cutting for long times in adverse conditions, while maintaining the operating gap within a relatively low tolerance.

Yet another object of the present invention is the provision of a device for automatically controlling the operating gap of a cutting head, which device is not unidirectional, is relatively inexpensive and can be conveniently mounted on existing cutting heads, such as cutting torches.

Yet another object of the present invention is the provision of a device, as defined above, which device skims along the surface of the plate being cut with essentially no contact between the device and the plate during normal automatic control operation.

A still further object of the present invention is the provision of a device, as defined above, which device can be adapted to control each of several cutting heads in a gang cutting operation in a manner that the control for the reciprocating drive motor for each cutting head or torch is controlled by an individual module at each head, which module can be easily replaced for rapid repair without disassembling the equipment.

In accordance with yet another object of the present invention is the provision of a method for employing the device defined above and a subassembly including the support frame and feelers, or the feelers themselves, for use in a device as defined above.

These and other objects and advantages will become apparent from the following description taken together with the drawings explained in the next section.

BRIEF DESCRIPTION OF THE DRAWINGS

FIG. 3 is an enlarged, partial view showing the cross-section taken generally along line 3-3 of FIG. 4;

FIG. 4 is an enlarged plan view taken generally along line 4—4 of FIG. 2 showing a portion in cross-section and including a schematic block diagram of the feedback control unit employed in the preferred embodiment of the present invention;

FIGS. 5-8 are schematic side views illustrating operating characteristics of the preferred embodiment of the present invention;

PREFERRED EMBODIMENT

Figure 1:
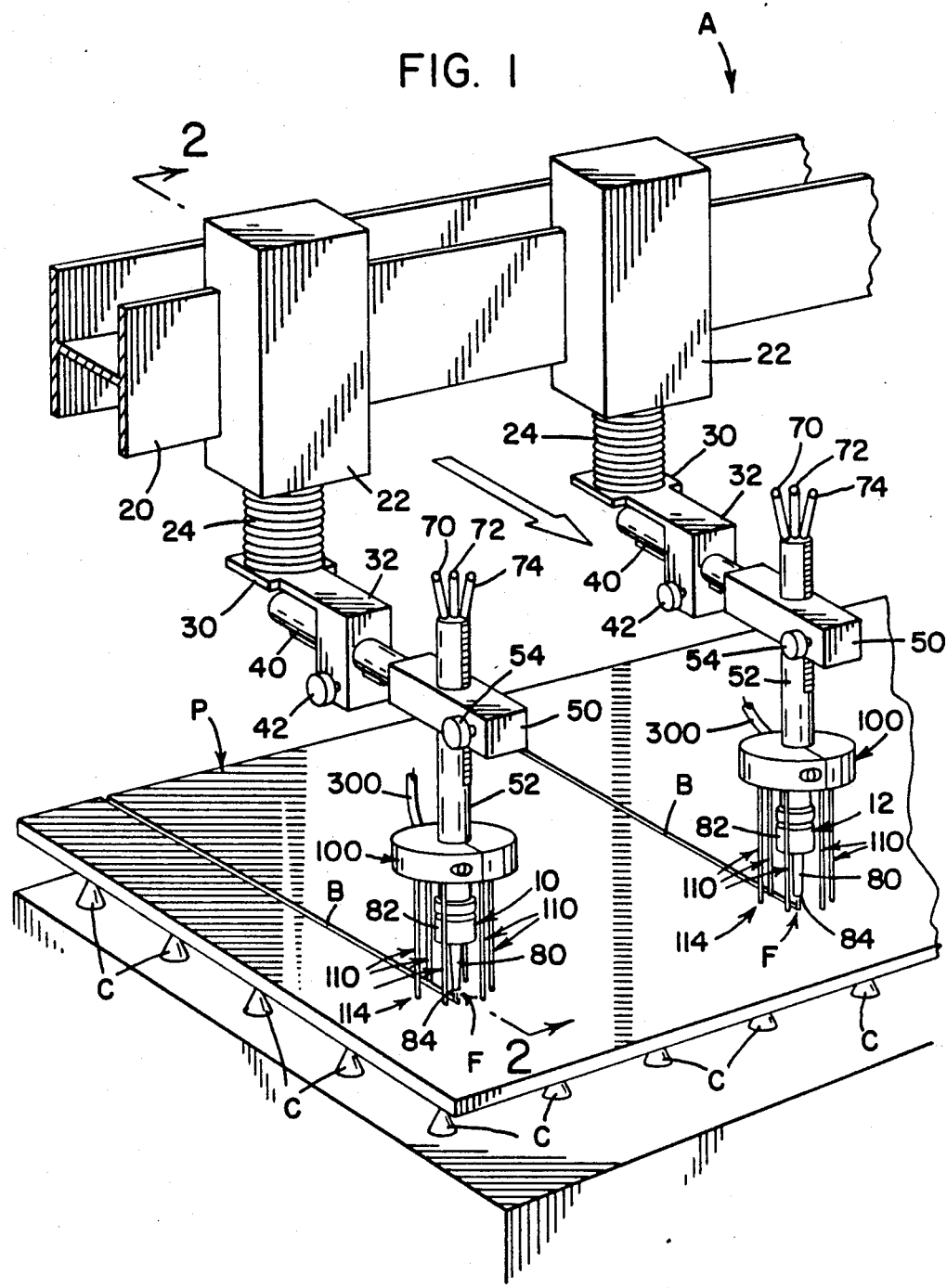
FIG. 1 is a pictorial view illustrating two cutting torches employing the preferred embodiment of the present invention.
Figure 2:
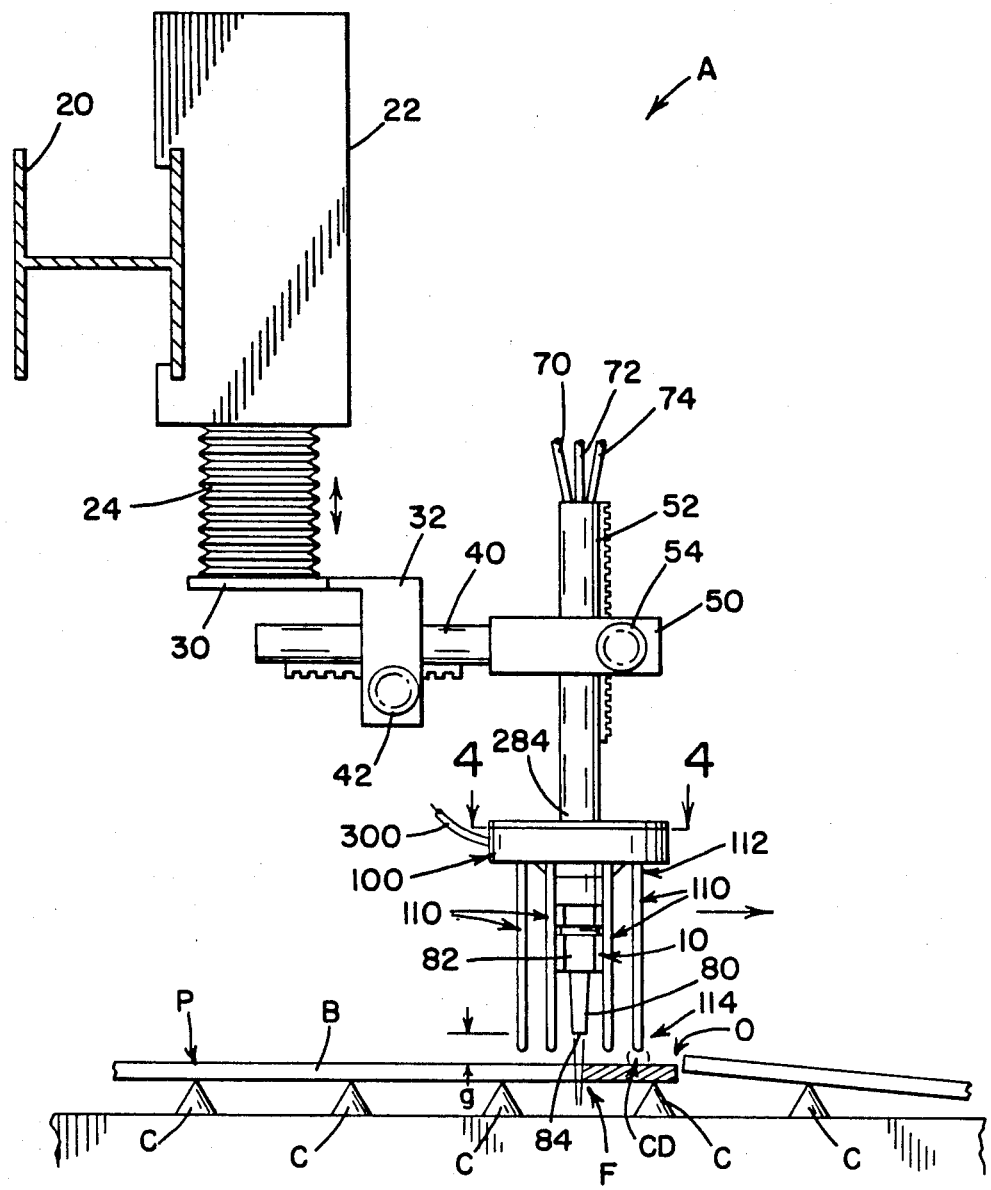
FIG. 2 is an enlarged side view taken generally along line 2—2 of FIG. 1.

Referring now to the drawings wherein the showings are for the purpose of illustrating the preferred embodiment only and not for the purpose of limiting same, FIGS. 1 and 2 illustrate a machine A for cutting a number of slots B from a metal plate P supported on a plurality of generally conical, cast iron pedestals C in accordance with standard practice. A plurality of heads 10, 12 in the form of gas cutting torches are mounted on a common beam 20 by an appropriate arrangement, schematically illustrated as housings 22 in each of which a motor, such as motor M shown in FIG. 4, is located. To cut slots B, cutting machine A moves the plurality of heads in unison by moving beam 20 over the generally flat upper surface of plate P. In accordance with normal practice, bellows 24 protect a control shaft operated by motor M for vertical movement toward or away from plate P for adjusting the height of each head 10, 12. Each of the heads moves separately in a vertical direction to compensate for various bowing and obstacles in the cutting path. In the illustrated embodiment, the shaft within bellows 24 is connected to bracket 30 having an outwardly extending bearing block 32 for reciprocally mounting rack 40 for movement of the rack in a horizontal plane with respect to block 32. Knob 42 can include a pinion and locking arrangement to secure rack 40 in a fixed position with respect to bearing block 32. In a similar fashion, bearing block 50 reciprocally receives a second guide rack 52 for movement of heads 10, 12 in a vertical direction. Knob 54 locks rack 52 within block 50 in a preselected vertical direction. The bearing blocks and rack arrangements allow the individual cutting heads to be adjusted with respect to bracket 30, if such adjustment is needed. These structures are illustrative in nature and do not form a part of the present invention. Indeed, the cutting heads could be mounted directly on plate 30 without the fine adjustment arrangements schematically illustrated FIGS. 1 and 2.

Referring now to cutting heads 10, 12, several of these heads are normally mounted on beam 20, even though only two are illustrated. Since each of thee heads, together with their support structures, operating arrangements and use of the present invention are identical, only cutting torch 10 will be described in detail and this description will apply equally to all of the other cutting heads supported on beam 20 for the purpose of cutting several parallel slots B. Cutting head 10 includes gas lines 70, 72 and electrical control line 74 so that acetylene and oxygen can be directed to the cutting head together with the appropriate starting power. Head 10 includes a downwardly extending replaceable tip or nozzle 80 held onto the head by a threaded collar 82, so that the lowermost end 84 of nozzle 80 is spaced from the upper surface of plate P a distance or gap g which is defined as the flame gap or flame length for flame F, even though the flame obviously protrudes inwardly through the slot. The cutting action does not need to involve a flame. After the cutting operation has started, it is generally sustainable by supply of oxygen; however, the term flame length indicates the operating gap which is the spacing g between tip 84 and the top of plate P. This spacing has a generally optimum value for the particular metal being cut to optimize the fuel consumption and oxygen consumption while maximizing the cutting speed. As so far described, a manual control arrangement for motor M allows an operator to visually inspect the operating gap and move bracket 30 in a vertical direction to maintain gap g at a desired length which is normally not optimum. When an obstacle 0, shown in FIG. 2, is approached, the operator abruptly moves the torch upwardly by causing retraction of the torch through upward movement of plate 30. This is not a normal occurrence; however, the plate is quite wavy, bows by heat and changes vertical height after cuts have been made so that the upward surface is not flat and requires substantial changes in the height of the individual torches to maintain a preselected cutting gap g for each torch as the torches are moved in unison along the upper surface of plate P.

The present invention involves a sensing unit for controlling gap g in accordance with relatively tight tolerances by employing an ultra-high voltage sensor including an appropriate support means or frame 100 for a plurality of downwardly hanging or dangling feelers 110 having upper ends 112 and lower terminal sensing ends 114. The feelers are elongated electrical conductive members as illustrated in more detail in FIGS. 3 and 4. Support frame 100 is in the form of a circular support ring or frame machined from insulating material to support a plurality of feelers 110 circumferentially spaced around nozzle or tip 80, as best shown in FIG. 4. In practice, six feelers 110 are employed; however, a various number of feelers could be used without departing from the intended spirit and scope of the present invention. Since feelers 110 are identical, only one feeler will be described in detail and this description will apply equally to the other feelers hanging downwardly from support ring or frame 100. These feelers are in an electrical circuit with workpiece P which circuit has an ultra-high voltage potential of at least about 2-5 K volts and preferably about 10 K volts. To complete this electrical circuit, feeler 110 is formed from an elongated conductive member 200 as shown in FIG. 3. Adjacent sensing end 114 there is provided a high resistance resistor 202 having leads 204, 206 to support this resistor in series in the high voltage circuit and at the lower end of member 200. Below the resistor, conductive tip 210 forms sensing end 114 of feeler 110. In practice, the axial length of resistor 202 is approximately 0.4 inches. Tip 210 has a length of approximately 0.15 inches. In this fashion, the resistor is at the end of the feeler to prevent the creation of a spark as end or tip 210 approaches plate P. A sustained Corona is established between the ends of tip 210 and the upper surface of plate P for the particular feeler coming the closest to the workpiece or plate.

In accordance with the preferred embodiment of the invention, the power or energy necessary to create a Corona between the end of a feeler and the upper surface of the plate is sufficient that only one Corona can be created at any given time. This Corona is used as the measuring parameter for maintaining the preselected distance d, as shown in FIG. 3, by measuring the electrical characteristics of the single Corona CD which will be under the particular feeler closest to the upper surface of plate P. In practice, resistor 202 is 20 meg-ohms and has a rating of 0.5 watts. At any given time, a single Corona or discharge CD exists between one of the feelers 110 and the workpiece. This Corona or discharge CD has electrical characteristics that change according to the length of the discharge. One of these characteristics can be monitored to provide a feedback arrangement to control motor M for the purpose of adjusting and maintaining the controlled g between end 84 of tip or nozzle 80 and plate P.

To prevent extraneous discharge, insulating cover 220 surrounds member 200 over at least a portion of the length of the member, with a bulbous portion 222 provided adjacent tip 210 to surround resistor 202, as illustrated in FIG. 3. In accordance with the preferred embodiment, conductive member 200 is formed from steel; however, it can be formed from other conductive material, such as copper. An upper head 230 is generally circular in configuration and is employed for supporting feeler 110 in support frame or ring 100.

As illustrated in FIG. 4, frame or support ring 100 includes a plurality of circumferentially spaced conductive rings or caps 250 angularly spaced around axis x coinciding with the reciprocal, central axis of tip 80. Caps 250 are radially spaced a given distance a from axis x and are evenly spaced circumferentially in accordance with the preferred embodiment of the invention, as illustrated in FIG. 4. The number of feelers can be changed; however, each feeler is supported in a conductive cap or ring 250 of support frame 100. It is within the invention to have several caps located around ring 100, without all of the caps being occupied by a feeler 110. In other words, with six receptacles or caps 250 may be used with only three or four feelers being employed.

The caps 250 are identical; therefore, only one will be described in detail and this description will apply equally to the other caps. Conductive cap 250 is machined from a conductive material, such as copper or steel, and includes a conical lower opening 260 and a conical upper shoulder 262 separated by a flat, upwardly facing contact surface 264. Head 230 rests upon surface 264 and member 200 hangs downwardly with the weight of the feeler maintaining flat surface-to-surface contact between the lower surface of head 230 and upwardly facing flat contact surface 264. Above cap 250 there is a clearance cavity 252 formed in the insulating material of frame or ring 100. This cavity includes a conical flared relief 270 generally matching shoulder 262 and outwardly terminating in a cylindrical bore 272, so that feeler 110 can be moved with respect to its illustrated operative position in FIG. 3 to an extreme position, shown in phantom lines in FIG. 3, allowing vertical upward movement of end 114, as well as substantial transverse oscillation. The downwardly hanging or dangling feeler 110 cannot be damaged as it engages obstacles, such as obstacle 0 shown in FIG. 2. As so far described, when lower end 114 engages plate P, it can be moved upwardly. This movement immediately disengages the high voltage electrical circuit including the feeler by moving the feeler away from surface 264. In addition, end 114 can be moved in all directions without damage to the downwardly hanging feeler.

Although the dimensions of cap 250 and cavity 252 do not form a part of the invention, in practice, head 230 has a diameter of 0.35 inches while the inside wall at the inwardmost end of shoulder 262 has a diameter of 0.40 inches. The outer diameter of shoulder 262 is 0.50 inches. The lower opening 260 of cap 250 is 0.25 inches in diameter while the diameter of member 200 is 0.10 inches. Insulation covering 220 may or may not be extended to the top of member 200. By these dimensions, free upward and swinging movement of the individual feelers is allowed.

Referring now to the support ring and electrical connections illustrated in FIG. 4, a locator key 280 circumferentially orients insulating ring 100 with respect to downwardly extending, cylindrical shaft 284 of cutting torch head 110. A clamp bolt 282 in the insulating material of ring 100 is tightened to lock ring 100 onto shaft 284 at the desired position. This position is fixed vertically as well as circumferentially so that the lower ends 114 of all feelers are in a common horizontal plane parallel to the plate being cut and having a preselected relationship, distance d with respect to the desired gap g, as illustrated in FIG. 3. Preselected distance d is set in the range of 0.05-0.30 inches with a tolerance of about 0.05 inches. Of course, this is the discharge length and is adjusted so that there is, indeed, a distance d maintained. The electrical characteristics of Corona CD are monitored to control the preselected distance d, which is the length of the discharge. This distance is less than the desired gap g so that stubbing of the feelers immediately shifts the torch upwardly without actual engagement of tip 80 with plate P.

A Tesla high voltage generator 310, or any other ultra-high voltage generator, is connected to line 300 and applies a 10 K volt voltage through line 300 to conductive caps 250 connected generally in two series branches. Of course, caps 250 could all be connected in series with line 300 without departing from the electrical function of the preferred embodiments of the invention. The high voltage generator has a measurable quantity, such as power, current or voltage which is indicative of the height or length of the Corona discharge CD appearing between one of the feelers and workpiece or plate P. This measurable quantity or electrical characteristic is indicative of the height of the Corona discharge and creates a signal in line 312 indicative of the measured discharge length. This signal is directed as a voltage signal in line 312 to a glow sensor 313 which has an internal reference signal indicated as line 314 to compare the measured electrical characteristic in line 312 with a reference characteristic adjusted by line 314. The comparison determines whether or not motor M should drive the head and in what direction. This feedback operation is indicated by a voltage in line 322. The voltage in line 322 controls a somewhat standard servo amplifier 320 to drive motor M in the desired vertical direction to maintain the Corona discharge distance d at a preselected value, within a prescribed tolerance. This automatic control of distance d, in turn, maintains gap g within the same tolerance. Since only a single Corona can be established by the power available from generator 310, the Corona being monitored is the Corona at the end of the feeler which is the closest to the plate P. This can change as the group of dangling feelers moves with cutting head 10 during the cutting operation.

In accordance with another aspect of the invention, the sensing and feedback circuitry is packaged into a single plug-in module 330 having an output connected to caps 250 and an output connected to the standard servo amplifier 320 for driving motor M in the desired vertical direction. The amplifier may be assembled in module 330 if desired. An adjustment at line 314 controls the desired monitored and maintained Corona discharge height used for sensing and controlling the optimum gap g between tip 80 and the workpiece during the cutting operation. By employing a plug-in module 330, repair of the system is quite convenient. The components of the module can be encapsulated so that factory adjustments maintain continuity of operation without requiring skill in adjustment by the end user.

Referring now to FIGS. 5-7, the operation of the present invention is clearly illustrated. In FIG. 5, the feelers 110 are hanging downwardly from frame 100 and are moving along the upper surface of plate P. A Corona or sustained ion discharge CD occurs below the feeler closest to plate P which is at the vertically highest portion of plate P. As the torch moves, another feeler can come closer to plate P by distortions or other surface changes of the plate. In that instance, since only sufficient power exists for a single Corona, the Corona changes to the new closest feeler having the lowest resistance since all of the feelers are in electrical parallel with respect to plate P and generator 310. At that time, the feedback signal in line 312 changes drastically indicating a shorter discharge distance d. This causes a signal in line 322 to change distance d to the desired value. Motor M is driven upwardly to again establish the desired length for distance d. This immediately changes the spacing of tip 80 with respect to the plate to control the spacing by the feeler newly acquiring the Corona discharge as illustrated in the change between FIG. 5 and FIG. 6. At all times, the spacing b between the end of all feelers and the end 84 of the tip is maintained constant by the adjusted position of ring 100 on shaft 284. Continued movement of the torch is illustrated in FIG. 7 where plate P presents another feeler with the shortest spacing between its end and the plate. The same process takes place wherein the Corona discharge is again transferred to the feeler having the shortest distance d and this distance is then adjusted by amplifier 320 to maintain the preselected distance d at the controlled value. Should the moving inductor cause a feeler 110 to engage an obstacle 0, as shown in FIG. 8, distance d is zero and the Corona discharge is lost. A very short length for distance d causes a rapid movement of motor M in a vertical direction. As can be seen, the polarity and magnitude of the signal output 324 of servo amplifier 320 determines the speed at which, and the direction in which, the motor is driven. Consequently, corrective measures are taken commensurate with the conditions sensed by feelers 110. Before the start of a cut, the motor M drives the feelers down to establish the first Corona preparatory to initiating the flame and starting movement of cutting heads along plate P to be controlled by employing the present invention.

ALTERNATIVE FEELERS

Figure 9:
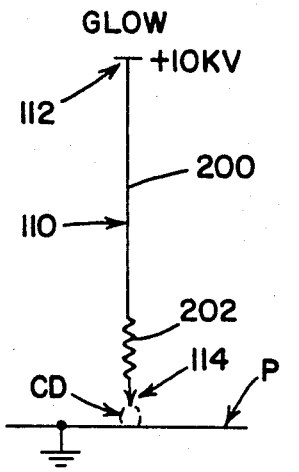
FIG. 9 is a schematic view of features found in a feeler constructed in accordance with te preferred embodiment of the present invention and shown in more detail than in FIG. 3.
Figure 10:
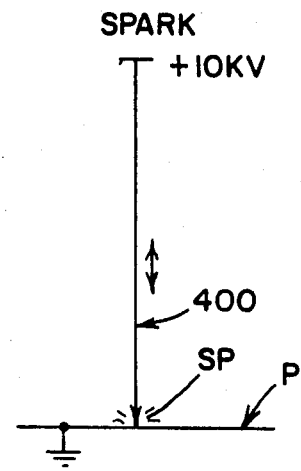
FIG. 10 is a schematic view like FIG. 9 showing a modified or alternative type feeler which may be employed in practicing the present invention.
Figure 11:
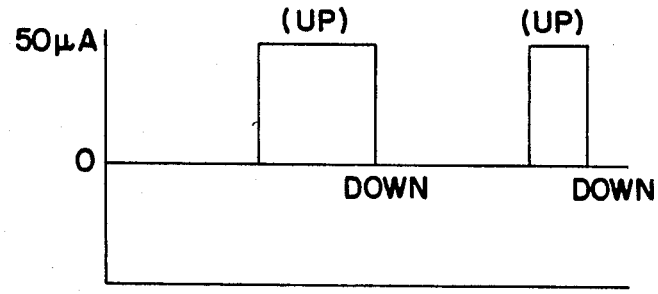
FIG. 11 is a graph showing the general operating characteristics of the system employing the alternative type feelers shown schematically in FIG. 10; and, FIGS. 12 and 13 are schematic views similar to FIGS. 5-8 illustrating operating characteristics of a system employing the alternative feelers schematically illustrated in FIG. 10.
Figures 12, 13:
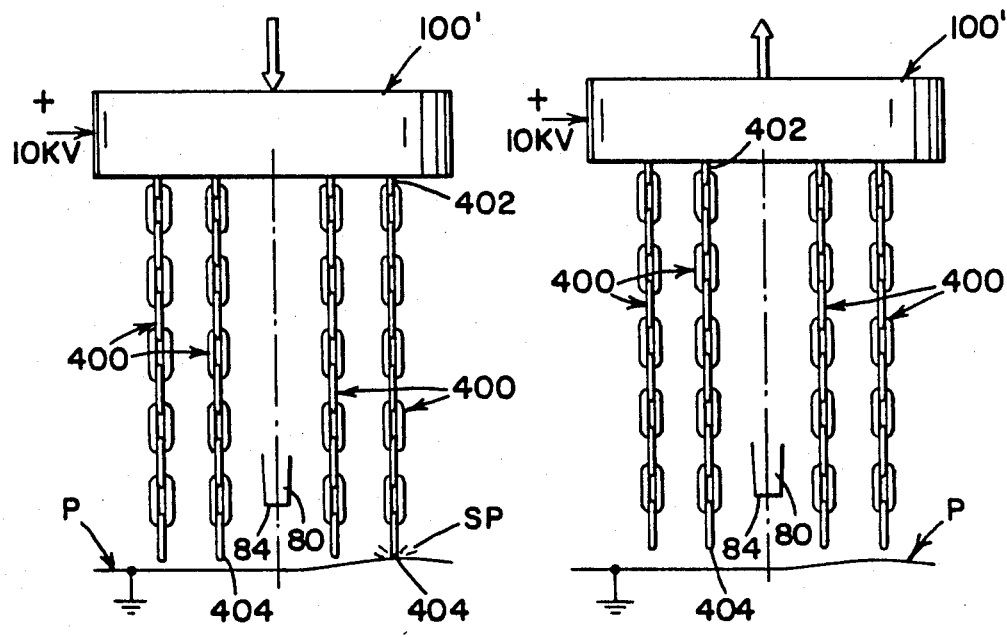

FIGS. 9-13 illustrate a modification of the individual hanging feelers and compares the operating characteristics with the feelers 110 of the preferred type previously described. In accordance with this alternative, the feelers are not rigid members 200 having a resistor adjacent the end to establish a discharge CD, as illustrated in FIG. 9, but are, a plurality of conductive chains 400 hanging downwardly from a ring 100', best shown in FIGS. 12 and 13. When one of the chains engages the upper surface of plate P, a spark SP occurs. This causes a signal in line 312 indicates the power dissipation or other electrical characteristics of the spark which causes amplifier 320 to drive motor M in the upper direction. This disengages the feeler from the plate. At that time the signal in line 312, when compared to a known condition or signal, is not a valid condition and requires a downward action of motor M; therefore, frame 100' begins to lower until another chain engages the workpiece to again causes upward movement of the torch by driving the motor in an upward direction. In this particular embodiment, the spark is not monitored on a continuous basis; therefore, the motor M should slowly drive the torch downward toward the workpiece until a spark is created. At that time, the torch is driven upwardly. This oscillatory action is indicated in FIG. 11 wherein a spark is sensed as a current flow or power dissipation causing the motor to move frame 100' upwardly. After the upward movement disengages the touching chain, frame 100' is moved downwardly slowly until there is another spark causing upward movement. In this fashion, the chains essentially float along the upper surface of plate P with intermittent sparks to cause upward movement of the torch and frame 100' carried by the torch. In this fashion, the spacing g is automatically maintained without actually monitoring the length of a glow or discharge which is the concept employed in the preferred embodiment. In both instances, an ultra-high voltage is employed which allows operation in extremely adverse atmospheric conditions and allows substantially high changes in the signal at line 312 to provide comparison with a reference to drive motor M for the purpose of maintaining the desired operating gap g for the cutting head as the head moves along plate P. A light spring could be employed for holding feelers 110 in the vertical position.

Having thus defined the invention, the following is claimed:

1. A Corona discharge feeler for use in an ultra-high voltage device for controlling the operating gap between a cutting head and a plate being cut, said feeler comprising an elongated electrically conductive member, a means on an upper one end of said member for mounting said member in position on a support means and a Corona discharge sustaining end on the lower other end of said member for directing current from an ultra-high voltage generator from said member to said plate, and said member including an impedance increasing means located therein adjacent said lower other end for controlling the discharge of said current from said member to said plate.

2. A device as defined in claim 1 wherein said feeler each comprises a conductive elongated member extending between said upper and lower ends.

3. A device as defined in claim 1 wherein said member is transversely flexible, axially rigid and includes a weight maintaining said member dangling vertically downward.

4. A device as defined in claim 2 wherein said feeler is a generally rigid element and including means for allowing said upper end of said rigid element to move vertically and oscillate transversely with respect to said support means.

5. A Corona discharge feeler as defined in claim 1, wherein the said impedance increasing means comprises a resistor connected into the said electrically conductive member adjacent the said lower end thereof.

6. A Corona discharge feeler as defined in claim 1, wherein the said elongated electrically conductive member is at least partially encased, throughout a portion of its length extending upwardly from and except for the lower tip end thereof, within a sleeve of electrically insulating material.

7. A Corona discharge feeler as defined in claim 1, wherein the said electrically conductive member is provided at its said upper end with a support head collar portion and is encased within a sleeve of electrically insulating material extending from, and except for the lower tip end thereof, to the said support head collar portion.

* * * * *